Dec. 13, 1932.   J. A. JOHNSTON   1,891,161
TRAP NEST
Filed June 6, 1932   2 Sheets-Sheet 1

Inventor
John A. Johnston

By Geo. P. Kimmel
Attorney

Dec. 13, 1932.  J. A. JOHNSTON  1,891,161
TRAP NEST
Filed June 6, 1932  2 Sheets-Sheet 2

Inventor
John A. Johnston
By Geo. P. Kimmel
Attorney

Patented Dec. 13, 1932

1,891,161

UNITED STATES PATENT OFFICE

JOHN A. JOHNSTON, OF PROVO, UTAH

TRAP NEST

Application filed June 6, 1932. Serial No. 615,681.

My invention relates to a trap nest.

The essential objects of my invention are to provide, in a manner as hereinafter set forth, a trap nest so constructed and arranged to trap the laying hen in and while the laying hen is on the nest and to close the occupied nest against other hens attempting to enter it and interfering with the occupant thereof; to cause the egg to roll to the rear of the nest bottom when the hen that has laid the egg steps out of the nest; to provide for the egg to pass into a receiving trough as a hen enters the nest to lay; prevent access of the hen within the nest to the receiving trough; and to attain these ends in a comparatively simple, strong, compact, durable, thoroughly efficient and comparatively inexpensive structure.

To the above ends essentially and others which may hereinafter appear, my invention consists of such parts and such combination of parts which fall within the scope of the invention as claimed.

Figure 1:
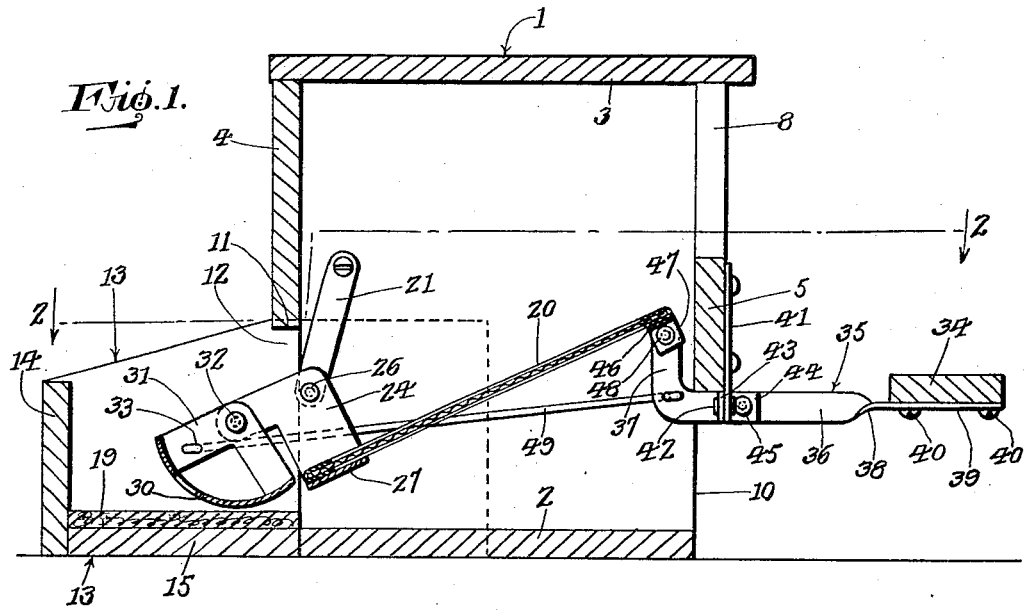
Figure 1 is a vertical sectional view of a trap nest in accordance with my invention and with the nest open.

The nest includes a closed top and bottom and an open front and rear housing generally indicated at 1 and comprising a bottom 2, a top 3, a rear wall 4, a pair of side walls 5, 6 and a front wall 7. The latter is of less height than, is secured against the front edges of and has its upper end flush with the top edges of the side walls. The wall 7 is cutout in its upper portion to provide an entrance and exit opening 8 for the hen and has its bottom edge 9 spaced above bottom 2 to provide a clearance 10. The back wall 4 is of less height than, is secured against the rear edges of and has its upper end flush with the top edges of the side walls. The bottom edge 11 of wall 4 is spaced above bottom 2 to provide the rear of housing 1 with a passage 12 for a shiftable egg guard to be referred to.

The top 3 is seated upon said front, rear and side walls.

Extending rearwardly from housing 1 is an egg receiving trough 13 including an outer wall 14, a bottom 15 and a pair of forwardly extended end walls 16, 17 of a width to be arranged against the outer faces of the side walls 5, 6 of housing 1. The inner side of trough 13 is open and such inner side registers with passage 12. The bottom 15 of trough 13 has its inner edge of the same length as and abuts the rear edge 18 of bottom 2 of housing 1. The length of trough 13 is such that the extended end walls thereof will frictionally engage the outer faces of side walls 5, 6 whereby the trough will be detachably connected to housing 1. The upper face of the bottom 15 of trough 13 has arranged thereon a pad 19 of cushioning material upon which the egg is deposited. It is to be understood that trough 13 can be constructed in any desired manner and detachably connected to housing 1 by any suitable means, the showing with respect to the trough and the manner of connecting it to the housing is but an embodiment of an egg receiving trough arranged in detachable co-relation with respect to housing 1.

The housing 1 in connection with a reticulated member 20 arranged therein constitutes a nest. The bottom of the latter is provided by the member 20, the latter being suspended within housing 1 adjacent bottom 2 of the latter. The member 20 normally inclines upwardly from rear to front and is shifted to a position in substantially parallel spaced relation with respect to bottom 2 when the hen enters the nest through opening 8.

The trap nest includes a hen operated combined egg guard and trapping mechanism comprising a pair of offset hangers 21, 22 secured to the inner face of the side walls 5, 6 in proximity to but above the top of passage 12. Pivotally suspended from the lower end of each hanger is an inverted L-shaped lever 23 including a vertical arm 24 and a horizontal arm 25 extended from the upper end of arm 24 in a direction towards trough 13. The upper inner corner of each lever 23 is pivotally connected, as at 26 to a hanger.

The lower end of arm 24 of each lever 23 is formed with an inwardly extending flange 27 which provides a seat for the member 20 at the rear side of the latter. The flanges 27 are fixedly secured to member 20 by rivets 28.

Arranged between the arms 24 and 25 is an egg guard 29 formed of a concaved slotted body part 30 formed at each end with a pair of arms 31 extending towards each other and overlapped at their outer ends. Each arm 25 at its outer end has journaled therein a pivot 32 to which the overlapped outer ends of a pair of arms 31 are fixedly secured. One of the arms of a pair of arms 31 is formed with an opening 33.

The mechanism also includes a normally horizontally disposed tread or step board 34 for the hen to facilitate her entrance into the nest through opening 8. The tread board 34 is movable upwardly from and downwardly to its normal position and functions to close opening 8 when moved upwardly and when the hen is nesting, and it can be shifted downwardly by the hen for the purpose of opening the nest to enable the hen to pass from the latter. The board 34 is mounted upon a pair of spaced, parallel angle-shaped supports 35, each formed of a horizontal and a vertical leg 36, 37 respectively. The legs 36 are twisted intermediate their ends, as at 38 to dispose the outer portions 39 thereof flatwise. The board 34 is mounted on portions 39 and secured to the latter, as at 40. Connected against the outer face of wall 5 and depending below edge 9 of the latter is a pair of spaced, parallel straps 41. Secured to the lower end of each strap 41, as at 42 is an angle member 43 having its flange 44 directed outwardly with respect to wall 5 and arranged at the inner side of a leg 36. Journaled in the flanges 44 and connected to the legs 36 are pivots 45 for the supports 35.

The legs 37 of supports 35 are arranged within housing 1 and normally are disposed in parallel spaced relation with respect to the inner face of wall 5. Secured to the lower face at the forward end of member 20 is an inverted yoke 46 having its sides 47 arranged between the free ends of the legs 37. The sides 47 of yoke 46 are pivotally connected to the legs 37, as at 48. One of the legs 37 has connected thereto the forward end of a coupling bar 49 and the rear end of the latter extends through opening 33 and is secured to guard 29.

Figure 4:
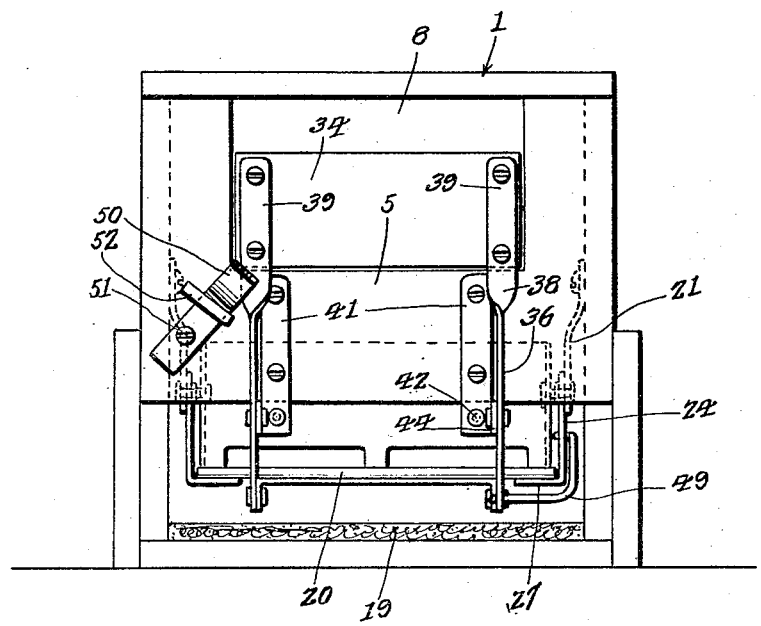
Figure 4 is a front elevation of the nest.

If desired, a latch may be employed for holding the board 34 in position to close opening 8 when the hen is on the nest to prevent the hen from leaving the latter. The latch is shown by way of example in Figure 4 and comprises a latching member 50 which is pivotally connected at its lower end, as at 51 to wall 5. A stop 52 is attached to wall 5 for limiting the movement of member 50 when shifting to latching position, and when so shifted to overlap the portion 39 of one of the supports 35.

Figure 2:
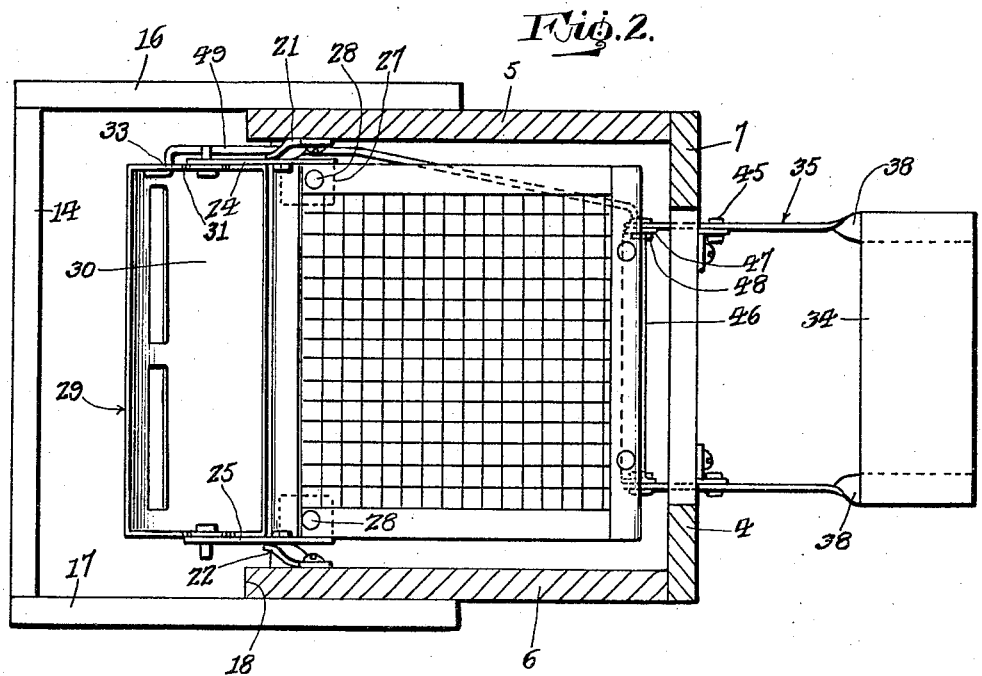
Figure 2 is a section on line 2—2 Figure 1.
Figure 3:
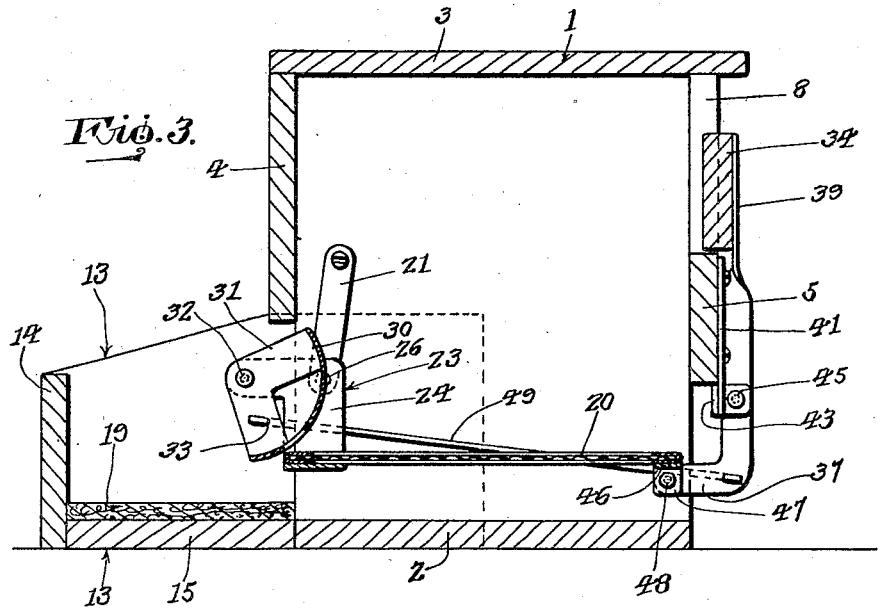
Figure 3 is a view similar to Figure 1 with the nest in trapping position.

The normal position of the trapping mechanism, when the nest is vacant is as shown in Figures 1 and 2, and in such position the board 34 is pulled down and provides an easy step for the hen. As the hen steps on the member 20, the board, which provides a gate or closure for the entrance opening 8 is swung upwardly to the position shown in Figures 3 and 4 for the purpose of closing opening 8, thus closing the hen in the nest and preventing other hens gaining access to the nest. After the hen has laid her egg she will put her head out of the nest above board 34 and push the latter open, that is downwardly. As the board 34 opens and the hen steps out of the nest, the member 20 which is the nest bottom is moved to an inclined position, thus causing the egg to roll to the rear of member 20 and against the guard. Here the egg remains until the next hen enters the nest, at which time the member 20 is forced to a level position and the guard recedes from the member, and turns to egg receiving position, thus releasing the egg and permitting it to roll into the guard. When member 20 is again depressed, the guard is swung to egg discharging position to deposit the egg into the trough and also to egg retarding position with respect to member 20.

The nest can be used singly or as a part of a series of nests. When used singly the receiving trough would be substantially as shown. When used in series, the trough may be individual for each nest or may be constructed so as to create a continuous trough along the rear of the nests without partitions.

The construction as referred to not only protects the hen from disturbances by other hens while on the nest, but also provides for depositing the eggs in the collecting trough whereby the nest is freed from the eggs and the latter at all times are spotlessly clean. The reticulated member 20 which constitutes the bottom of the nest is easily cleaned and further the structural arrangement is such that it permits easy cleaning under member 20.

What I claim is:—

1. A structure providing a nest, said nest having a suspended, reticulated bottom normally extending at an upward inclination from rear to front, a combined entrance and exit at its front for the hen and a discharge passage at its rear for a laid egg; and a combined egg discharge passage guard for discharging a laid egg, nest closing and opening and hen trapping mechanism pivotally suspended from and within said structure, said mechanism being fixed to the rear and pivotally connected to the front of said bottom, extending rearwardly from said structure, and extending forwardly from and hingedly suspended at the front of said structure, said bottom being depressible by and on the entrance of the hen into the nest for shifting said mechanism to hen trapping, egg discharge passage closing and egg discharging position and said mechanism being actuated by the hen when leaving the nest for shifting it to nest opening and laid egg receiving positions.

2. A structure providing a nest, said nest having a suspended, reticulated bottom normally extending at an upward inclination from rear to front, a combined entrance and exit at its front for the hen and a discharge passage at its rear for a laid egg; a combined egg discharge passage guard for discharging a laid egg, nest closing, nest opening and hen trapping mechanism pivotally suspended from and within said structure, said mechanism being fixed upon the rear and pivotally connected to the front of said bottom, extending rearwardly from said structure and extending forwardly from and hingedly suspended from the front of said structure, said bottom being depressible on the entrance of the hen into the nest for shifting said mechanism to hen trapping, egg discharge passage closing and egg discharging positions and said mechanism being actuated by the hen when leaving the nest for shifting it to nest opening and laid egg receiving positions, and an egg receiving trough extended from said structure and communicating with said passage for receiving a previously laid egg when said bottom is depressed.

3. In combination, a structure providing a nest having a hen depressible reticulated bottom, a pair of spaced supports pivotally suspended from the front of said structure and extending into the nest, a tread member carried by said supports exteriorly of the nest for controlling entrance and exit from the latter, a pair of hanger members pivotally supported within the nest above said nest bottom, levers pivotally suspended from said hanger members and fixed to said bottom, a combined egg guard and depositor element pivotally suspended from said levers, and a coupling bar between one of said supports and said egg guard and depositor element.

4. In combination, a structure providing a nest having a hen depressible reticulated bottom, a pair of spaced supports pivotally suspended from the front of said structure and extending into the nest, a tread member carried by said supports exteriorly of the nest for controlling entrance and exit from the latter, a pair of hanger members pivotally supported within the nest above said bottom, levers pivotally suspended from said hanger members and fixed to said nest bottom, a combined egg guard and depositor element pivotally suspended from said levers, and a coupling bar between one of said supports and said element, each of said levers consisting of a pair of arms disposed at an angle to each other, one being fixed to said bottom and the other being pivotally connected to said element.

5. The combination with a nest having a suspended, depressible reticulated bottom normally inclining from rear to front, a combined entrance and exit opening at its front and an egg discharge passage at its rear, of an egg discharge and hen trapping controlling mechanism arranged within and extended from the front of said nest, and including a closure for said combined entrance and exit opening actuated to open position by a hen in leaving the nest, said mechanism being connected to the front and rear of said bottom, and being suspended at its rear within the nest and having said closure hinged exteriorly to the front of the nest, the egg discharge controlling means of said mechanism being arranged at said passage.

6. The combination with a nest having a suspended, depressible reticulated bottom normally inclining from rear to front, a combined entrance and exit opening at its front and an egg discharge passage at its rear, of an egg discharge and hen trapping controlling mechanism arranged within and extended from the front of said nest, and including a closure for said combined entrance and exit opening actuated to open position by a hen in leaving the nest, said mechanism being connected to the front and rear of said bottom, and being suspended at its rear within the nest and having said closure hinged exteriorly to the front of the nest, the egg discharge controlling means of said mechanism being rotatable and arranged at said passage, and a trough communicating with said egg discharge passage for receiving the egg from said egg discharge controlling means.

In testimony whereof, I affix my signature hereto.

JOHN A. JOHNSTON.